United States Patent
Huh

(10) Patent No.: US 12,110,003 B2
(45) Date of Patent: Oct. 8, 2024

(54) HYBRID VEHICLE AND CONTROL METHOD THEREOF

(71) Applicants: Hyundai Motor Company, Seoul (KR); Kia Corporation, Seoul (KR)

(72) Inventor: Jeewook Huh, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 231 days.

(21) Appl. No.: 17/835,678

(22) Filed: Jun. 8, 2022

(65) Prior Publication Data

US 2023/0009058 A1 Jan. 12, 2023

(30) Foreign Application Priority Data

Jul. 12, 2021 (KR) .................. 10-2021-0090773

(51) Int. Cl.
*B60W 20/13* (2016.01)
*B60W 20/12* (2016.01)

(52) U.S. Cl.
CPC ............ *B60W 20/13* (2016.01); *B60W 20/12* (2016.01); *B60W 2510/244* (2013.01); *B60W 2520/10* (2013.01); *B60W 2555/60* (2020.02)

(58) Field of Classification Search
CPC ............... B60W 20/13; B60W 20/12; B60W 2510/244; B60W 2520/10; B60W 2555/60; B60W 2552/20; B60W 2710/244; B60W 10/06; B60W 10/08; B60W 10/26; B60W 20/15; B60W 40/10; B60W 40/105; B60W 2520/00; B60W 2556/50; B60K 6/442; Y02T 10/62; Y02T 10/70; B60L 53/00; B60L 58/12; B60Y 2200/92; B60Y 2400/112
See application file for complete search history.

(56) References Cited

U.S. PATENT DOCUMENTS

2019/0001957 A1* 1/2019 Park .................. B60W 10/08

FOREIGN PATENT DOCUMENTS

KR 10-1601222 B1 3/2016

* cited by examiner

*Primary Examiner* — Michael V Kerrigan
(74) *Attorney, Agent, or Firm* — Morgan, Lewis & Bockius LLP

(57) ABSTRACT

A hybrid vehicle includes an engine, a drive motor selectively operated as a generator to generate electrical energy; a battery charged with the electrical energy generated in the drive motor; a navigation device determining a travelling path of the hybrid vehicle from a departure of the hybrid vehicle to a destination of the hybrid vehicle and an expected vehicle speed of the travelling path; and a controller which divides an entire travelling path of the hybrid vehicle expected by the navigation device into one or more travelling sections based on the travelling information, determines an average vehicle speed of each travelling section, an average vehicle speed of the entire travelling path, and travelling energy of the vehicle in each travelling section, determines an expected State Of Charge (SOC) profile of the battery based on the travelling energy, and determines a charge mode of the battery based on the average vehicle speed and an initial SOC value of the expected SOC profile.

20 Claims, 12 Drawing Sheets

HYBRID VEHICLE AND CONTROL METHOD THEREOF

CROSS-REFERENCE TO RELATED APPLICATION

The present application claims priority to Korean Patent Application No. 10-2021-0090773 filed on Jul. 12, 2021, the entire contents of which is incorporated herein for all purposes by this reference.

BACKGROUND OF THE INVENTION

Field of the Present Disclosure

The present disclosure relates to a hybrid vehicle and a control method thereof.

Description of Related Art

A hybrid vehicle is a vehicle that utilizes two or more power sources, and generally refers to a hybrid electric vehicle driven by use of an engine and a motor. The hybrid electric vehicle may form various structures using two or more power sources formed of an engine and a motor.

In general, the hybrid electric vehicle utilizes a power train in the method of Transmission Mounted Electric Device (TMED) in which a drive motor, a transmission and a driveshaft are serially connected.

Furthermore, a clutch is provided between the engine and the motor, and the hybrid electric vehicle is operated in an Electric Vehicle (EV) mode or a Hybrid Electric Vehicle (HEV) mode depending on whether the clutch is engaged. The EV mode is a mode in which the vehicle travels only with driving force of the drive motor, and the HEV mode is a mode in which the vehicle travels with driving force of the drive motor and the engine.

In a hybrid vehicle, it is very important to manage a State Of Charge (SOC), which is the amount of charge in a battery that supplies power to the drive motor and electronic components provided in the vehicle.

However, generally, a situation in which the engine is turned on or off to manage the SOC value of the battery at an appropriate level occurs frequently, resulting in a problem in that fuel efficiency of the vehicle is lowered.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid vehicle which is configured for improving fuel efficiency of a vehicle through an optimal control of a State Of Charge (SOC), and a control method thereof.

Various aspects of the present disclosure are directed to providing a hybrid vehicle, including: an engine which generates power by combustion of fuel; a drive motor which is selectively coupled to the engine and generates power and is selectively operated as a generator to generate electrical energy; a battery which is electrically connected to the drive motor and supplies electrical energy to the drive motor and is charged with the electrical energy generated in the drive motor; a navigation device which determines a travelling path of the hybrid vehicle from a departure of the hybrid vehicle to a destination of the hybrid vehicle and an expected vehicle speed of the travelling path; and a controller which divides an entire travelling path of the hybrid vehicle expected by the navigation device into one or more travelling sections based on the expected vehicle speed of the travelling path, determines an average vehicle speed of each travelling section, an average vehicle speed of the entire travelling path, and travelling energy of the vehicle in each travelling section, determines an expected State Of Charge (SOC) profile of the battery based on the travelling energy, and determines a charge mode of the battery based on the average vehicle speed of the entire travelling path and an initial SOC value of the expected SOC profile.

The controller may distinguish the travelling section based on a point at which the expected vehicle speed of the travelling path is changed by a set speed or more.

The controller may distinguish the travelling section based on a speed limit of the travelling path.

When the average vehicle speed of the entire travelling path is equal to or greater than a set speed, the controller may perform a first charge mode, and when the average vehicle speed of the entire travelling path is less than the set speed, the controller may perform a second charge mode or a third charge mode according to the initial SOC value of the expected SOC profile.

When the initial SOC is smaller than a set SOC, the controller may perform the second charge mode, and when the initial SOC is equal to or greater than the set SOC, the controller may perform the third charge mode.

In the first charge mode, the battery may be charged through the drive motor by turning on the engine in a region in which the vehicle speed is equal to or greater than the set speed.

In the second charge mode, when the SOC value of the battery reaches a threshold SOC, the battery may be charged through the drive motor by turning on the engine.

In the third charge mode, the battery may be charged through the drive motor by turning on the engine in a section in which an inclination of the expected SOC profile is equal to or greater than a set inclination.

The expected SOC profile may mean an amount of SOC changed when the hybrid vehicle travels to the destination in a current SOC with an Electric Vehicle (EV) mode.

Various aspects of the present disclosure are directed to providing a method of controlling a hybrid vehicle, the control method including: determining a travelling path of the hybrid vehicle from a departure of the hybrid vehicle to a destination of the hybrid vehicle and an expected vehicle speed of the travelling path; dividing the travelling path into one or more travelling sections based on the expected vehicle speed of the travelling path or a speed limit of the travelling path; determining an average vehicle speed of each travelling section and an average vehicle speed of the entire travelling path; determining an expected State Of Charge (SOC) profile of the battery based on travelling energy of the hybrid vehicle in each travelling section; and determining a charge mode of the battery based on the average vehicle speed of the entire travelling path and an initial SOC value of the expected SOC profile.

The travelling section may be divided based on a point at which the expected vehicle speed of the travelling path is changed by a set speed or greater than the set speed.

The travelling section may be divided according to a speed limit of the travelling path.

When the average vehicle speed of the entire travelling path is equal to or greater than a set speed, a first charge mode may be performed, and when the average vehicle speed of the entire travelling path is less than the set speed, a second charge mode or a third charge mode may be performed according to the initial SOC value of the expected SOC profile.

When the initial SOC is smaller than a set SOC, the second charge mode may be performed, and when the initial SOC is equal to or greater than the set SOC, the third charge mode may be performed.

In the first charge mode, the battery may be charged through the drive motor by turning on the engine in a region in which the vehicle speed is equal to or greater than the set speed.

In the second charge mode, when the SOC value of the battery reaches a threshold SOC, the battery may be charged through the drive motor by turning on the engine.

In the third charge mode, the battery may be charged through the drive motor by turning on the engine in a section in which an inclination of the expected SOC profile is equal to or greater than a set inclination.

The expected SOC profile may mean an amount of SOC changed when the hybrid vehicle travels to the destination in a current SOC with an Electric Vehicle (EV) mode.

As described above, according to the hybrid vehicle and the control method thereof according to the exemplary embodiment of the present disclosure, the charge mode of the battery is determined based on the average vehicle speed of the travelling path and the expected SOC profile, improving fuel efficiency of the vehicle.

Furthermore, the situation in which the engine is turned on is minimized, decreasing the sense of disparity felt by the driver.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
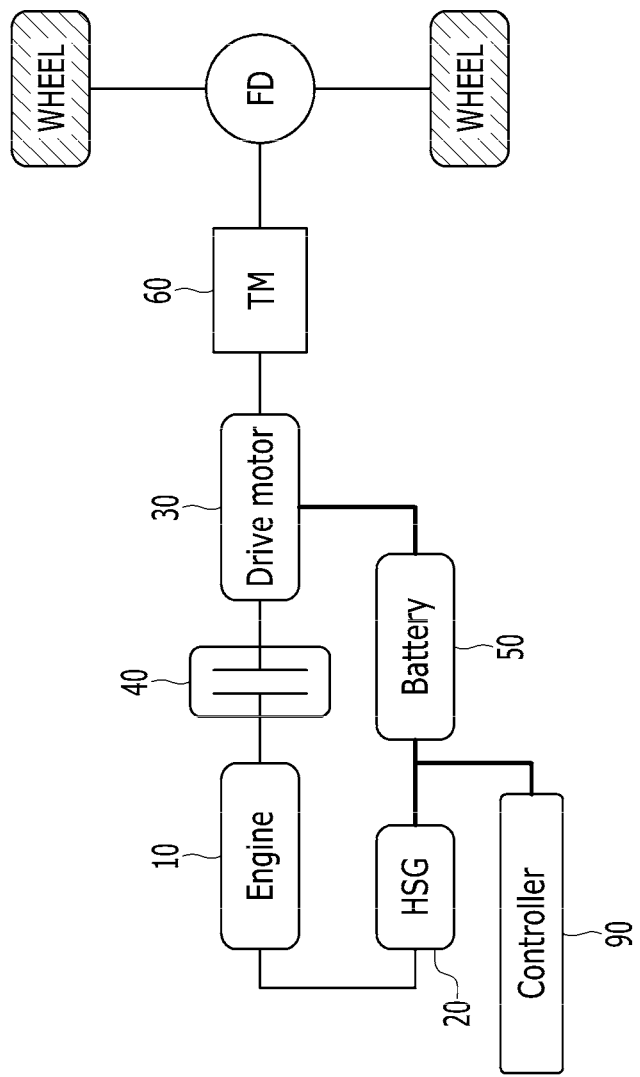
FIG. 1 is a conceptual diagram illustrating a configuration of a hybrid vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

Furthermore, the size and thickness of each configuration shown in the drawings are arbitrarily shown for understanding and ease of description, but the present disclosure is not limited thereto, and the thickness of multiple parts and regions are exaggerated for clarity.

Hereinafter, a hybrid vehicle according to various exemplary embodiments of the present disclosure will be described in detail with reference to the accompanying drawings.

FIG. 1 is a conceptual diagram illustrating a configuration of a hybrid vehicle according to various exemplary embodiments of the present disclosure. Furthermore, FIG. 2 is a block diagram illustrating a configuration of the hybrid vehicle according to the exemplary embodiment of the present disclosure.

Figure 2:
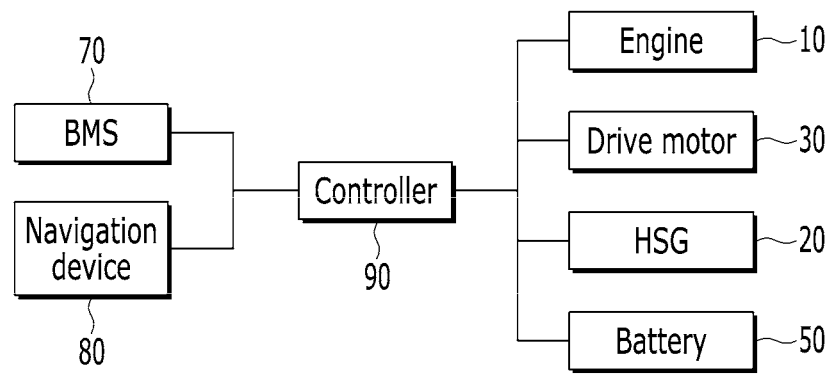
FIG. 2 is a block diagram illustrating a configuration of the hybrid vehicle according to the exemplary embodiment of the present disclosure.

As illustrated in FIG. 1 and FIG. 2, a hybrid vehicle according to various exemplary embodiments of the present disclosure may include an engine 10, a Hybrid Starter and Generator (HSG) 20, a drive motor 30, a clutch 40, a battery 50, a battery management system 70, and a controller 90.

The engine 10 generates power required for travelling of the vehicle by combusting fuel.

The HSG 20 starts the engine 10, and is selectively operated as a generator in the state where the engine 10 is started to generate electrical energy. The electrical energy generated through the HSG 20 is charged in the battery 50.

The drive motor 30 generates power required for travelling of the vehicle from the power charged in the battery 50, and is selectively operated as a generator to generate electrical energy. The drive motor 30 is operated by use of the electrical energy charged in the battery 50, and the electrical energy generated in the drive motor 30 is charged in the battery 50.

A Battery Management System (BMS) 70 determines a situation of the battery 50 through information related to the battery 50 detected in a plurality of sensors (for example, a temperature sensor, and a voltage sensor), and manages the battery 50 to have an optimum state. The BMS 70 performs functions of measuring the remaining capacity of the battery 50, maintaining the State of charge (SOC) value of the battery 50 at an appropriate level, measuring and managing the temperature of the battery 50, and the like.

The clutch 40 is provided between the engine 10 and the drive motor 30. Depending on the engagement of the clutch 40, the hybrid vehicle may travel in an Electric Vehicle (EV) mode or a Hybrid Electric Vehicle (HEV) mode. The EV mode is a mode in which the vehicle travels only with driving force of the drive motor 30, and the HEV mode is a mode in which the vehicle travels with driving force of the drive motor 30 and the engine 10.

Power output from the engine 10 and the drive motor 30 is transmitted to a driving wheel provided in the vehicle. In the instant case, a transmission 60 is provided between the clutch 40 and a differential FD of the driving wheel. A transmission gear is provided inside the transmission 60, so that power output from the engine 10 and the drive motor 30 may be changed according to a transmission gear stage.

The controller 90 controls the constituent elements of the vehicle including the engine 10, the HSG 20, the driving motor 30, and the battery 50.

To the present end, the controller 90 may be provided with one or more processors operated by a set program, and the set program performs each operation of a method of controlling the hybrid vehicle according to various exemplary embodiments of the present disclosure.

A hybrid vehicle according to the exemplary embodiment of the present disclosure may include a navigation device 80, and a Global Positioning System (GPS) module which detects a position of a vehicle.

The navigation device 80 receives a departure and a destination from a driver and determines a travelling path of a vehicle, and transmits travelling information including the travelling path, a speed limit of the travelling path, and an expected vehicle speed of the travelling path to the controller 90. The travelling path determined in the navigation device 80 may be provided to the driver through an input/output module.

The Global Positioning System (GPS) module detects a position of the vehicle, and the position of the vehicle detected in the GPS module is transmitted to the controller 90.

Hereinafter, a method of controlling the hybrid vehicle according to various exemplary embodiments of the present disclosure will be described in detail with reference to the accompanying drawings.

Figure 3:
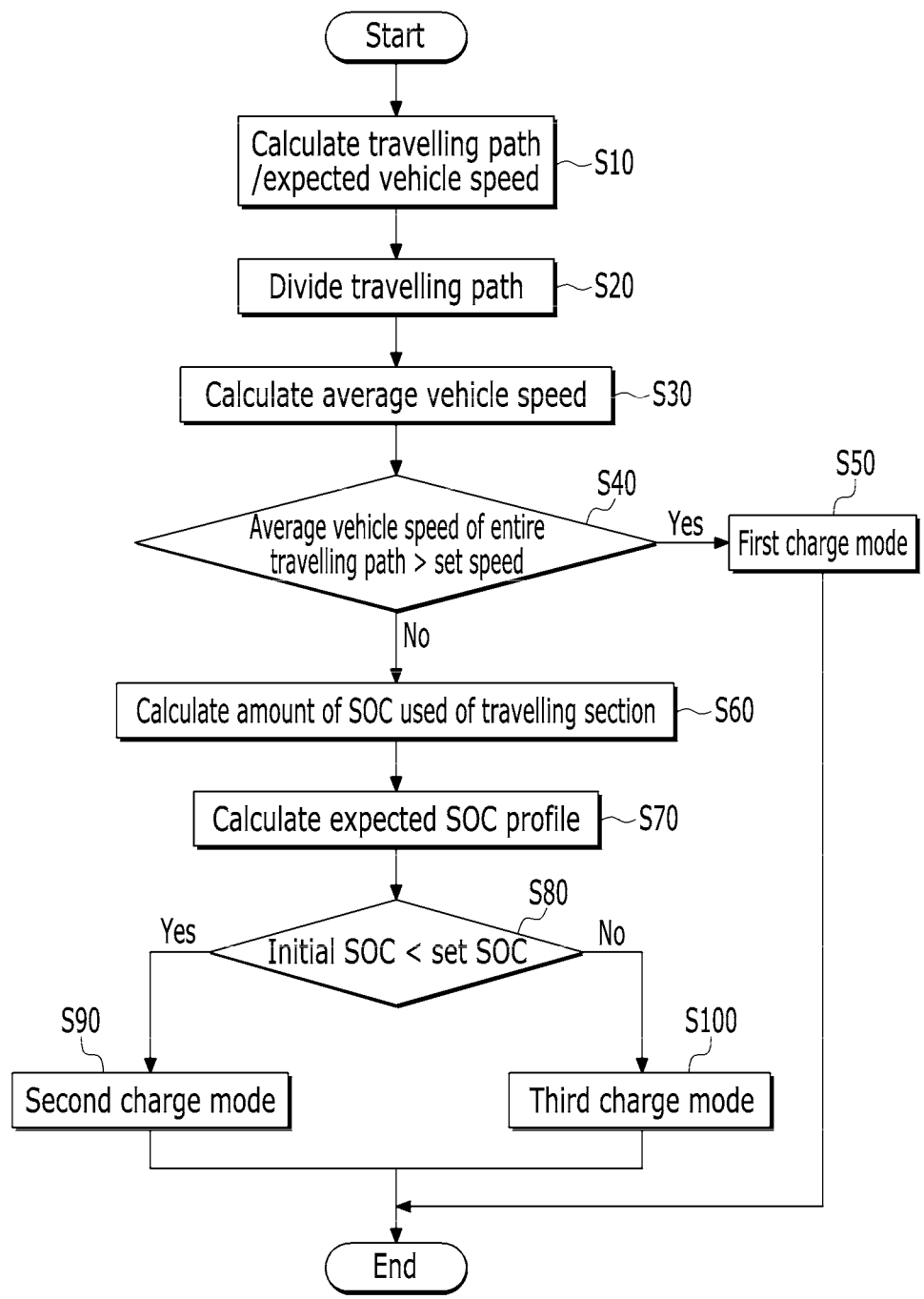
FIG. 3 is a flowchart illustrating a method of controlling a hybrid vehicle according to various exemplary embodiments of the present disclosure.

FIG. 3 is a flowchart illustrating a method of controlling a hybrid vehicle according to various exemplary embodiments of the present disclosure.

As illustrated in FIG. 3, when a driver inputs a destination to the navigation device 80, the navigation device 80 determines or predicts a travelling path to the destination and determines an expected vehicle speed of the travelling path (S10). The expected vehicle speed of the travelling path determined in the navigation device 80 is transmitted to the controller 90.

The controller 90 divides the travelling path into one or more travelling sections based on the expected vehicle speed of the travelling path transmitted from the navigation device 80 (S20).

The controller 90 may distinguish the travelling section based on the expected vehicle speed of the travelling path. In the instant case, the controller 90 may distinguish the travelling section based on a point at which the expected vehicle speed is changed by a set speed or greater than the set speed.

Figure 4:
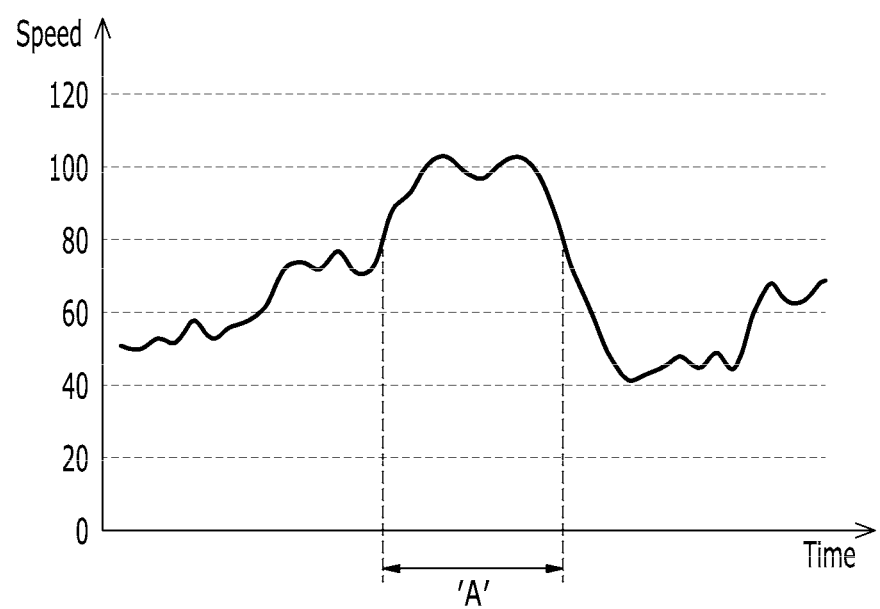
FIG. 4 is a graph illustrating an expected vehicle speed of a travelling path according to the exemplary embodiment of the present disclosure.
Figure 5:
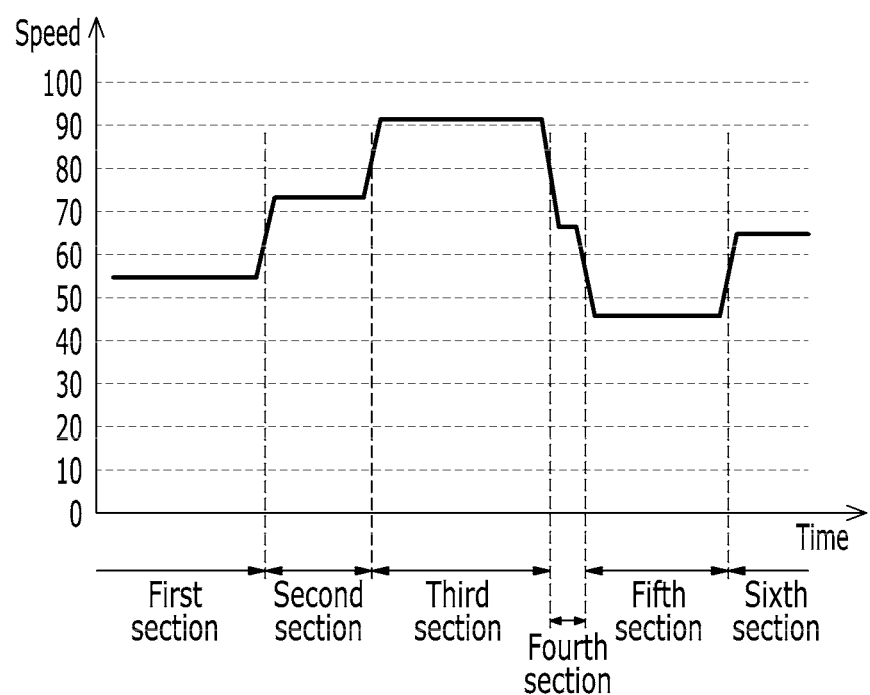
FIG. 5 is a graph illustrating a plurality of divided travelling sections according to the exemplary embodiment of the present disclosure.

FIG. 4 is a graph illustrating an expected vehicle speed of a travelling path according to the exemplary embodiment of the present disclosure. FIG. 5 is a graph illustrating a plurality of divided travelling sections according to the exemplary embodiment of the present disclosure.

Referring to FIG. 4 and FIG. 5, the travelling path may be divided into six travelling sections based on the point at which the expected vehicle speed is sharply changed. In an exemplary embodiment of the present invention, the travelling path may be divided into predetermined travelling sections based on the point at which the expected vehicle speed is sharply changed, such as at an absolute value of a predetermined change rate or greater than the absolute value.

Otherwise, the controller 90 may distinguish the travelling section based on the expected vehicle speed of the travelling path. For example, the travelling path to the destination may be 100 km, a speed limit from the destination to the 30 km point may be 50 km/h, a speed limit from the 30 km point to the 60 km point may be 60 km/h, and a speed limit from the 60 km point to the 100 km point may be 70 km/h. The controller 90 may divide the travelling path into three travelling sections from the destination to the 30 km point, from the 30 km point to the 60 km point, and from the 60 km point to the 100 km point.

The controller 90 determines an average vehicle speed of each travelling section and an average vehicle speed of the entire travelling path (S30) by averaging the average vehicle speed of each travelling section.

When the average vehicle speed of the entire travelling path is equal to or greater than a set speed (S40), the controller 90 manages the SOC value of the battery 50 by performing a first charge mode (S50).

Figure 6:
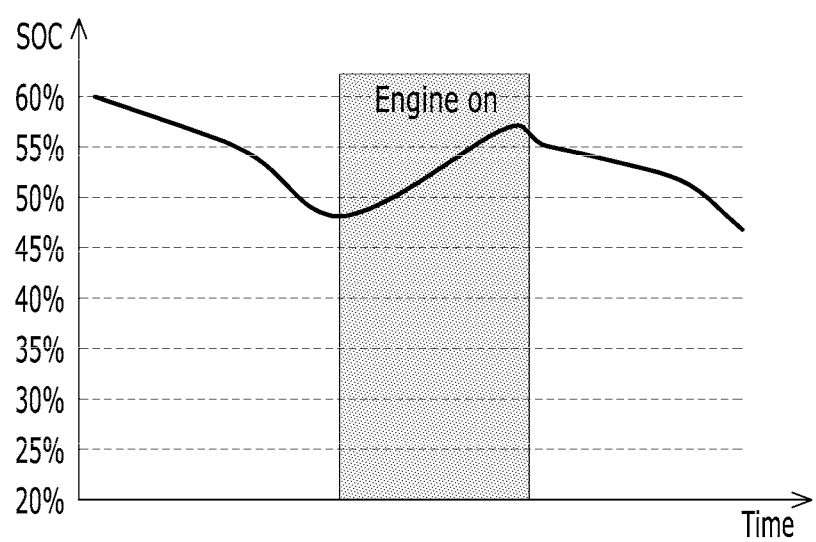
FIG. 6 is a graph illustrating an actual State Of Charge (SOC) profile in a first mode according to the exemplary embodiment of the present disclosure.

The first charge mode is the mode in which the battery 50 is charged through the drive motor 30 or the HSG 20 by turning on the engine 10 in a region in which the vehicle speed is equal to or greater than a set speed (see FIG. 6). For example, the battery 50 may be charged through the drive motor 30 or the HSG 20 by turning on the engine 10 in region an in which the vehicle speed in the expected vehicle speed of the travelling path determined in FIG. 4 is equal to or greater than a set speed (for example, 80 km/h). As described above, efficiency may be improved by turning on the engine 10 in the region in which the vehicle speed is high. Furthermore, since the situation in which the engine 10 is turned on at a low speed decreases, the fuel efficiency felt by the driver may be improved.

Figure 7:
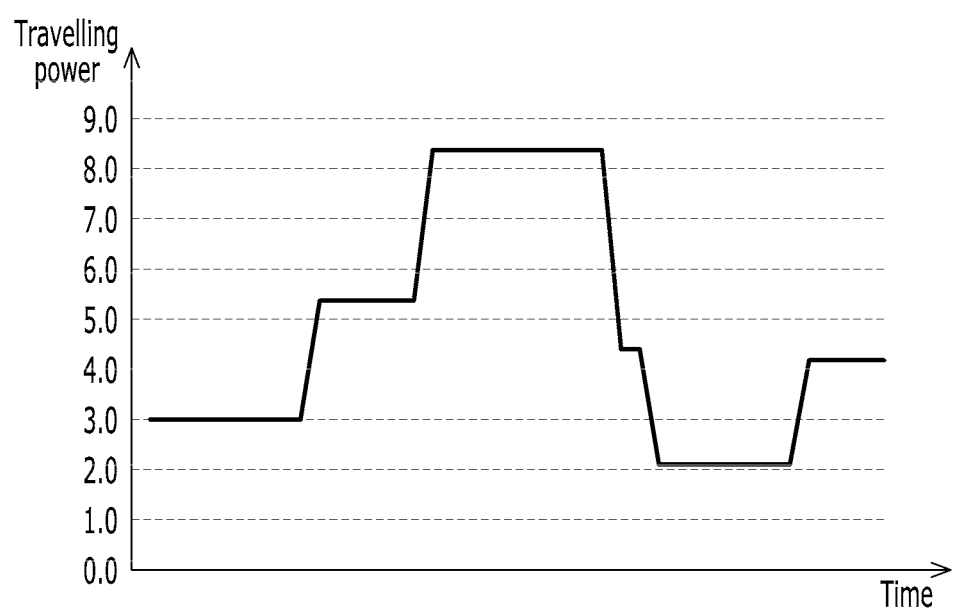
FIG. 7 is a graph illustrating travelling power in each travelling section according to the exemplary embodiment of the present disclosure.
Figure 8:
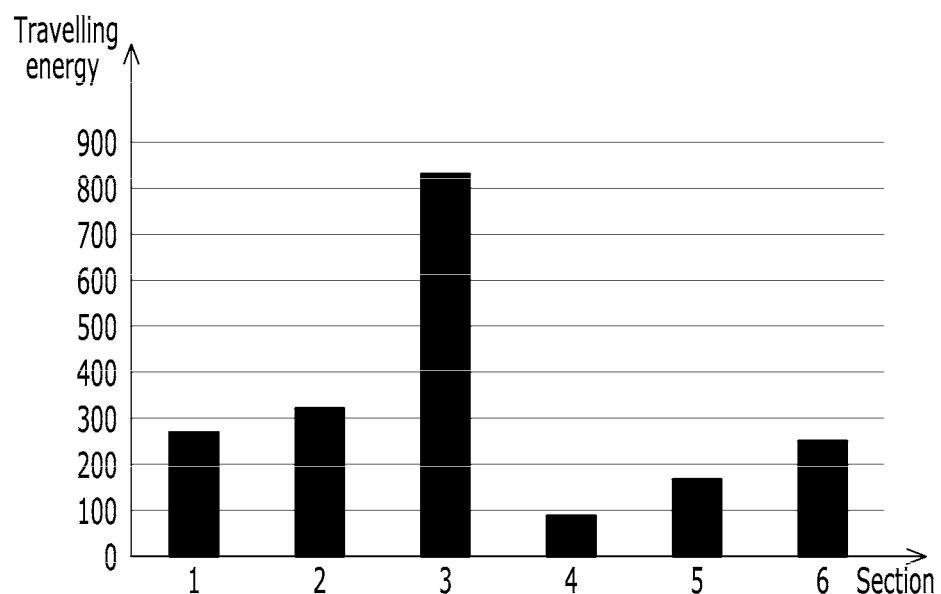
FIG. 8 is a graph illustrating travelling energy in each travelling section according to the exemplary embodiment of the present disclosure.
Figure 9:
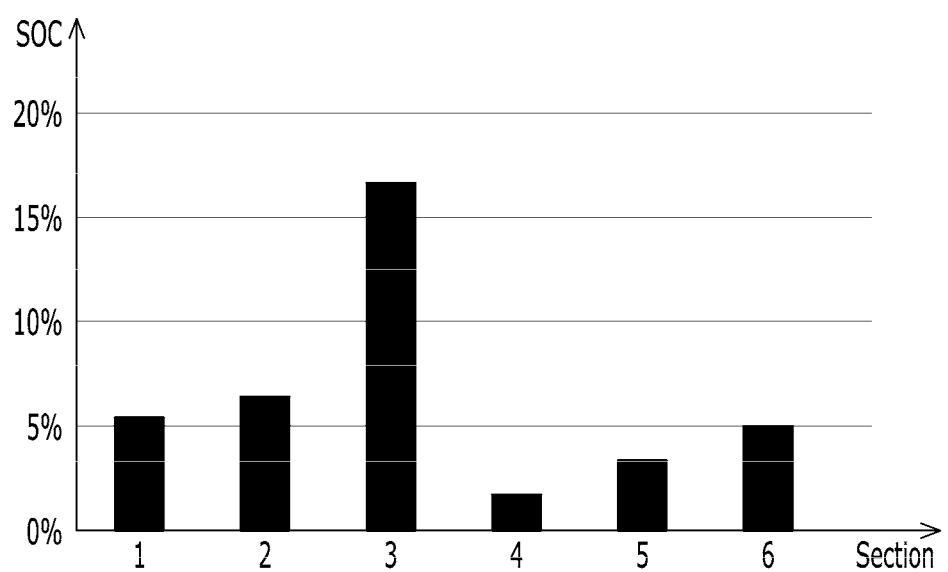
FIG. 9 is a graph illustrating the amount of SOC used in each travelling section according to the exemplary embodiment of the present disclosure.

The controller 90 determines travelling power (see FIG. 7) of each travelling section, and determines travelling energy (see FIG. 8) of each travelling section based on the travelling power. The travelling energy may be determined by integrating the travelling power. The controller 90 determines the amount of SOC used (see FIG. 9) in each travelling section based on the travelling energy (S60).

The controller 90 determines an expected SOC profile (see FIG. 10) from the departure to the destination (S70). The expected SOC profile means the amount of SOC changed when the vehicle travels to the destination in the EV mode in the current SOC and may be determined based on the amount of SOC used in each travelling section.

In operation S40, when the average vehicle speed of the entire travelling path is less than the set speed, a second charge mode or a third charge mode is performed according to an initial SOC in the expected SOC profile. That is, the controller 90 determines the charge mode of the battery 50 based on the initial SOC in the expected SOC profile (S70). In the instant case, when the initial SOC is smaller than a set SOC, the controller 90 manages the SOC value of the battery 50 by performing the second charge mode (S80), and when the initial SOC is equal to or greater than a threshold SOC, the controller 90 manages the SOC value of the battery 50 by performing the third charge mode (S90).

In the second charge mode, the controller 90 operates the vehicle in the EV mode until the SOC value of the battery 50 reaches the threshold SOC which is smaller than the set SOC, and when the SOC value of the battery 50 reaches the threshold SOC, the controller 90 charges the battery 50 through the drive motor 30 or the HSG 20 by turning on the engine 10. That is, when the SOC value of the battery 50 is smaller than the threshold SOC, the vehicle is operated in the HEV mode.

Figure 11:
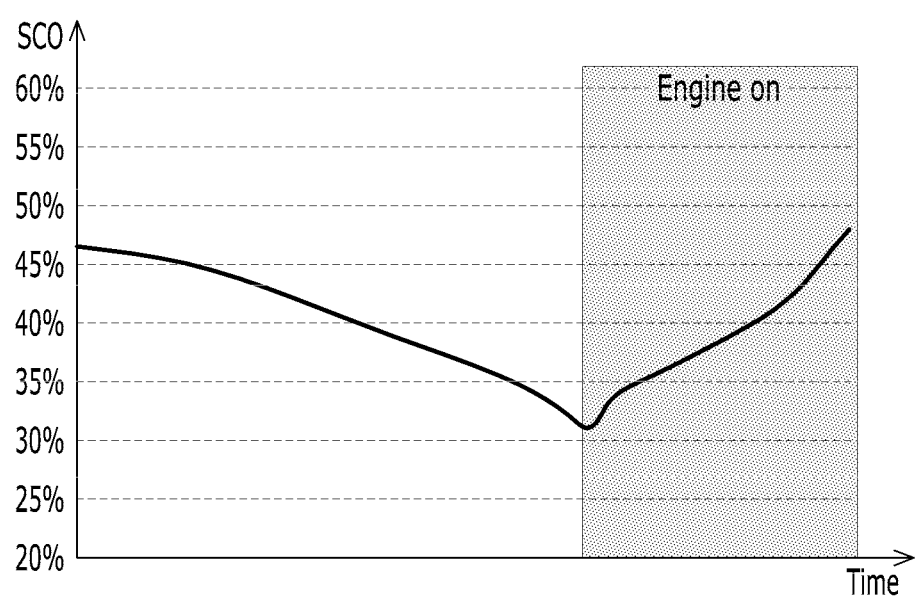
FIG. 11 is a graph illustrating an actual SOC profile in a second charge mode according to the exemplary embodiment of the present disclosure.

The second charge mode is the method of charging the battery 50 through the drive motor 30 or the HSG 20 by turning on the engine 10 in the region in which the SOC decreases (see FIG. 11), and the efficiency may deteriorate, but it is possible to minimize the situation in which the engine 10 is turned on and prevent the SOC value of the battery 50 from excessively decreasing.

In the third charge mode, the controller 90 charges the battery 50 through the drive motor 30 or the HSG 20 by turning on the engine 10 in a section in which an inclination of the expected SOC profile is equal to or greater than a set inclination.

Figure 10:
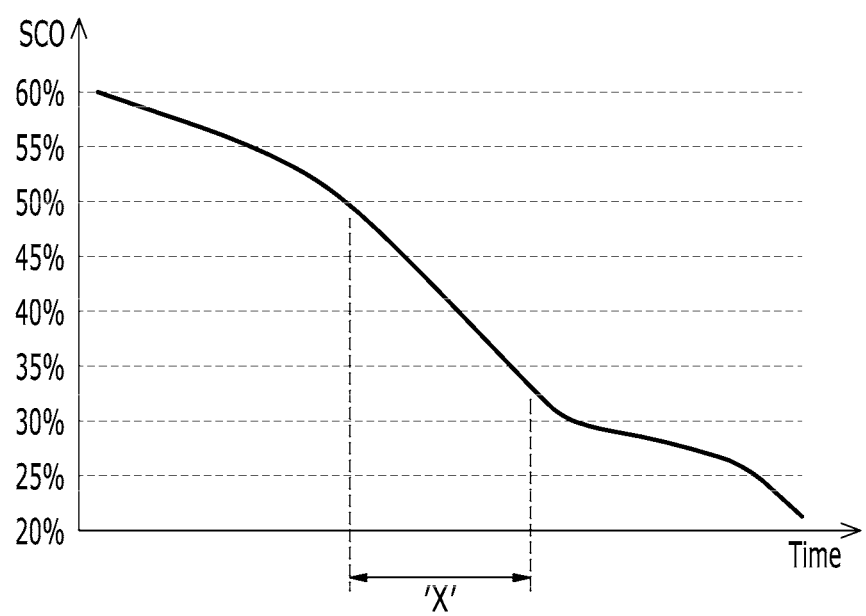
FIG. 10 is a graph illustrating an expected SOC profile according to the exemplary embodiment of the present disclosure.
Figure 12:
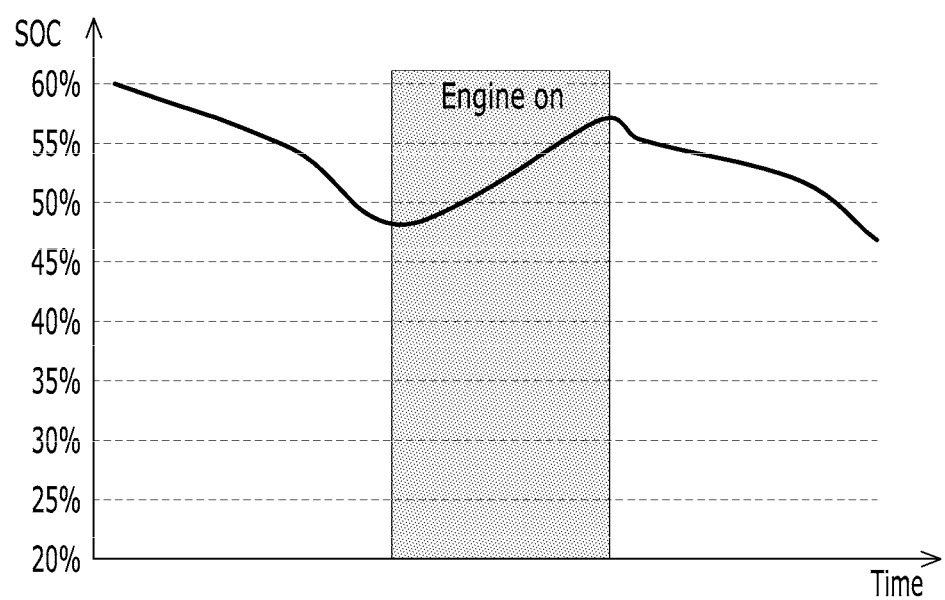
FIG. 12 is a graph illustrating an actual SOC profile in a third charge mode according to the exemplary embodiment of the present disclosure.

For example, the controller 90 may charge the battery 50 through the drive motor 30 or the HSG 20 by turning on the engine 10 in region X in which an inclination of the determined expected SOC profile in FIG. 10 is greater than the set inclination. The fact that the inclination of the expected SOC profile is large may mean that the travelling energy is large, so that the amount of SOC used is large. In the third charge mode, the battery 50 is charged through the drive motor 30 or the HSG 20 by turning on the engine 10 in the region in which the amount of SOC used is large, so that the third charge mode is most efficient (see FIG. 12).

As described above, according to the hybrid vehicle and the control method thereof according to the exemplary embodiment of the present disclosure, the charge mode of the battery 50 is determined based on the average vehicle speed of the travelling path and the expected SOC profile, improving fuel efficiency of the vehicle.

Furthermore, the situation in which the engine 10 is turned on is minimized, decreasing the sense of disparity felt by the driver.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hybrid vehicle, comprising:
   an engine which generates power by combustion of fuel;
   a drive motor which is selectively coupled to the engine and generates power and is selectively operated as a generator to generate electrical energy;
   a battery which is electrically connected to the drive motor and supplies electrical energy to the drive motor and is charged with the electrical energy generated in the drive motor;
   a navigation device which determines a travelling path of the hybrid vehicle from a departure of the hybrid vehicle to a destination of the hybrid vehicle and an expected vehicle speed of the travelling path; and
   a controller which is configured to divide an entire travelling path of the hybrid vehicle expected by the navigation device into one or more travelling sections based on the expected vehicle speed of the travelling path, to determine an average vehicle speed of each travelling section, an average vehicle speed of the entire travelling path by averaging the average vehicle speed of each travelling section, and travelling energy of the vehicle in each travelling section, to determine an expected State Of Charge (SOC) profile of the battery based on the travelling energy, and to determine a charge mode of the battery based on the average vehicle speed of the entire travelling path and an initial SOC value of the expected SOC profile.

2. The hybrid vehicle of claim 1, wherein the controller is configured for distinguishing each travelling section based on a point at which the expected vehicle speed of the travelling path is changed by a set speed or greater than the set speed.

3. The hybrid vehicle of claim 1, wherein the controller is configured for distinguishing each travelling section based on a point at which the expected vehicle speed is changed at an absolute value of a predetermined change rate or greater than the absolute value.

4. The hybrid vehicle of claim 1, wherein the controller is configured for distinguishing each travelling section according to a speed limit of the travelling path.

5. The hybrid vehicle of claim 1, wherein
   when the average vehicle speed of the entire travelling path is equal to or greater than a set speed, the controller is configured to perform a first charge mode, and
   when the average vehicle speed of the entire travelling path is less than the set speed, the controller is configured to perform a second charge mode or a third charge mode according to the initial SOC value of the expected SOC profile.

6. The hybrid vehicle of claim 5, wherein
   when the initial SOC is smaller than a set SOC, the controller is configured to perform the second charge mode, and
   when the initial SOC is equal to or greater than the set SOC, the controller is configured to perform the third charge mode.

7. The hybrid vehicle of claim 6, wherein in the first charge mode, the battery is charged through the drive motor by the controller turning on the engine in a region in which a vehicle speed is equal to or greater than a set speed.

8. The hybrid vehicle of claim 6, wherein in the second charge mode, when the SOC value of the battery reaches a threshold SOC, the battery is charged through the drive motor by the controller turning on the engine.

9. The hybrid vehicle of claim 6, wherein in the third charge mode, the battery is charged through the drive motor by the controller turning on the engine in a section in which an inclination of the expected SOC profile is equal to or greater than a set inclination.

10. The hybrid vehicle of claim 1, wherein the expected SOC profile means an amount of SOC changed when the hybrid vehicle travels to the destination in a current SOC with an Electric Vehicle (EV) mode.

11. A method of controlling a hybrid vehicle, the method comprising:
    determining, by a controller, a travelling path of the hybrid vehicle from a departure of the hybrid vehicle to a destination of the hybrid vehicle and an expected vehicle speed of the travelling path;
    dividing, by the controller, the travelling path into one or more travelling sections based on the expected vehicle speed of the travelling path or a speed limit of the travelling path;
    determining, by the controller, an average vehicle speed of each travelling section and an average vehicle speed of an entire travelling path by averaging the average vehicle speed of each travelling section;
    determining, by the controller, an expected State Of Charge (SOC) profile of a battery based on travelling energy of the hybrid vehicle in each travelling section; and
    determining, by the controller, a charge mode of the battery based on the average vehicle speed of the entire travelling path and an initial SOC value of the expected SOC profile.

12. The method of claim 11, wherein each travelling section is divided based on a point at which the expected vehicle speed of the travelling path is changed by a set speed or greater than the set speed.

13. The method of claim 11, wherein the controller is configured for distinguishing each travelling section based on a point at which the expected vehicle speed is changed at an absolute value of a predetermined change rate or greater than the absolute value.

14. The method of claim 11, wherein each travelling section is divided according to a speed limit of the travelling path.

15. The method of claim 11, wherein
when the average vehicle speed of the entire travelling path is equal to or greater than a set speed, a first charge mode is performed, and
when the average vehicle speed of the entire travelling path is less than the set speed, a second charge mode or a third charge mode is performed according to the initial SOC value of the expected SOC profile.

16. The method of claim 15, wherein
when the initial SOC is smaller than a set SOC, the second charge mode is performed, and
when the initial SOC is equal to or greater than the set SOC, the third charge mode is performed.

17. The method of claim 16, wherein in the first charge mode, the battery is charged through a drive motor by the controller turning on an engine in a region in which a vehicle speed is equal to or greater than a set speed.

18. The method of claim 16, wherein in the second charge mode, when the SOC value of the battery reaches a threshold SOC, the battery is charged through a drive motor by the controller turning on an engine.

19. The method of claim 16, wherein in the third charge mode, the battery is charged through a drive motor by the controller turning on an engine in a section in which an inclination of the expected SOC profile is equal to or greater than a set inclination.

20. The method of claim 11, wherein the expected SOC profile means an amount of SOC changed when the hybrid vehicle travels to the destination in a current SOC with an Electric Vehicle (EV) mode.

* * * * *